(12) United States Patent
Jain

(10) Patent No.: US 12,457,593 B2
(45) Date of Patent: Oct. 28, 2025

(54) DYNAMIC SUBCARRIERS ALLOCATION FOR SECURED WIRELESS NETWORKS

(71) Applicant: Fortinet, Inc., Sunnyvale, CA (US)

(72) Inventor: Ankur Jain, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 310 days.

(21) Appl. No.: 18/216,792

(22) Filed: Jun. 30, 2023

(65) Prior Publication Data

US 2025/0008499 A1   Jan. 2, 2025

(51) Int. Cl.
*H04W 12/121* (2021.01)
*H04W 72/0453* (2023.01)
*H04W 72/563* (2023.01)

(52) U.S. Cl.
CPC ..... *H04W 72/0453* (2013.01); *H04W 12/121* (2021.01); *H04W 72/563* (2023.01)

(58) Field of Classification Search
CPC ........... H04W 12/121; H04W 72/0453; H04W 72/563; H04W 84/12

USPC ......................................................... 370/329
See application file for complete search history.

(56) References Cited

U.S. PATENT DOCUMENTS

| | | | |
|---|---|---|---|
| 2022/0311563 A1* | 9/2022 | Tao ..................... | H04W 72/044 |
| 2023/0100553 A1* | 3/2023 | Jain ..................... | H04W 12/084 370/329 |
| 2024/0394368 A1* | 11/2024 | Yu .......................... | G06F 21/56 |

* cited by examiner

*Primary Examiner* — Robert J Lopata
(74) *Attorney, Agent, or Firm* — Law Office of Dorian Cartwright; Dorian Cartwright

(57) ABSTRACT

A current activity score is periodically calculated for each Wi-Fi 6E station from the data traffic based on malicious activity identified for each Wi-Fi 6E station. Responsive to having OFDMA data to send downlink and more than two Wi-Fi 6E stations are addressed, a precedence between the stations involved in determined. A bandwidth quantity of subcarriers is dynamically allocated in a channel between the more than two stations with more bandwidth quantity allocated to a higher precedence station.

10 Claims, 6 Drawing Sheets

DYNAMIC SUBCARRIERS ALLOCATION FOR SECURED WIRELESS NETWORKS

FIELD OF THE INVENTION

The invention relates generally to computer networks, and more specifically, to dynamic subcarrier allocation of Orthogonal Frequency Division Multiple Access (OFDMA) data between Wi-Fi 6E stations based on known malicious activity.

BACKGROUND

The IEEE 802.11ax WLAN standard enabled simultaneous OFDMA transmissions to multiple users. Each user is assigned different subsets of RU subcarriers to achieve simultaneous data transmission in MU (Multi-Users) environment. Resource Unit (RU) is a unit in OFDMA terminology used in 802.11ax WLAN to denote a group of subcarriers (tones) used in both Downlink (DL) and Uplink (UL) transmissions. Each subcarrier is carrying some useful data. By the subcarrier allocation, stations may have lower or higher bandwidth based on no of subcarriers allocated to that station. In Wi-Fi 6E, OFDMA technology enables two or more than two users to get the data simultaneously by dividing the channel into multiple subcarriers and each group of subcarriers carries data based on RSSI and station type. These OFDMA users perform various activities on network and subcarriers are allocated to these users regardless of activities.

Some OFDMA uses connected to network start to misbehave by accessing unauthorized data, malicious sites, non-permitted applications, services, banned file attachments in email, or breach confidential data.

What is needed is a robust technique for dynamic subcarrier allocation of OFDMA data between Wi-Fi 6E stations based on known malicious activity. Good user behavior is thus rewarded with higher priority to OFDMA data bursts.

SUMMARY

To meet the above-described needs, methods, computer program products, and systems for dynamic subcarrier allocation of OFDMA data between Wi-Fi 6E stations based on known malicious activity.

In one embodiment, data traffic is monitored for each of the Wi-Fi 6E stations for malicious activity. Each Wi-Fi 6E station is wirelessly coupled over a Wi-Fi network to the Wi-Fi 6E access point to reach the data communication network. A current activity score is periodically calculated for each Wi-Fi 6E station from the data traffic based on malicious activity identified for each Wi-Fi 6E station. A precedence index is then assigned for each Wi-Fi 6E station as a relative ranking between the Wi-Fi 6E stations, based on the current activity score.

In another embodiment, responsive to having non-OFDMA data to send downlink, skipping look-ups in the precedence table and transmitting the non-OFDMA data downlink over the Wi-Fi network. Responsive to having OFDMA data to send downlink and more than two Wi-Fi 6E stations are addressed, the precedence table is looked-up to find out the precedence index for the stations involved in the OFDMA data to send to the more than two stations. A bandwidth quantity of subcarriers is dynamically allocated in a channel between the more than two stations. More bandwidth quantity is allocated to a higher precedence index.

In still another embodiment, a HE MU-PPDU data frame in generated a HE-SIG-B field destined for each of the more than two stations, including a resource unit (RU) allocation bitmap representing subcarrier allocation. The OFDMA data is transmitted downlink over the Wi-Fi network to the more than two stations, within the HE MU-PPDU data frame, according to bandwidth allocation of the RU allocation.

Advantageously, computer networking is improved with more secure and efficient network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for dynamic data frame puncturing to manage Wi-Fi 7 channel bandwidth. Generally, puncturing is when a transmitting device omits portions of a channel bandwidth. One of ordinary skill in the art will recognize many alternative embodiments that are not explicitly listed based on the following disclosure.

Figure 2:
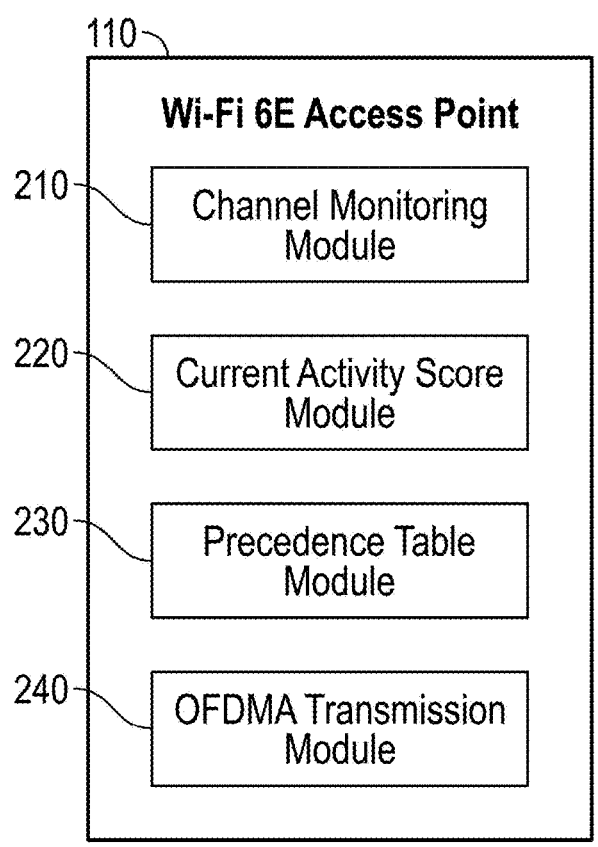
FIG. 2 is a more detailed block diagram illustrating a Wi-Fi 6E access point of the system of FIG. 1, according to one embodiment.
Figure 3:
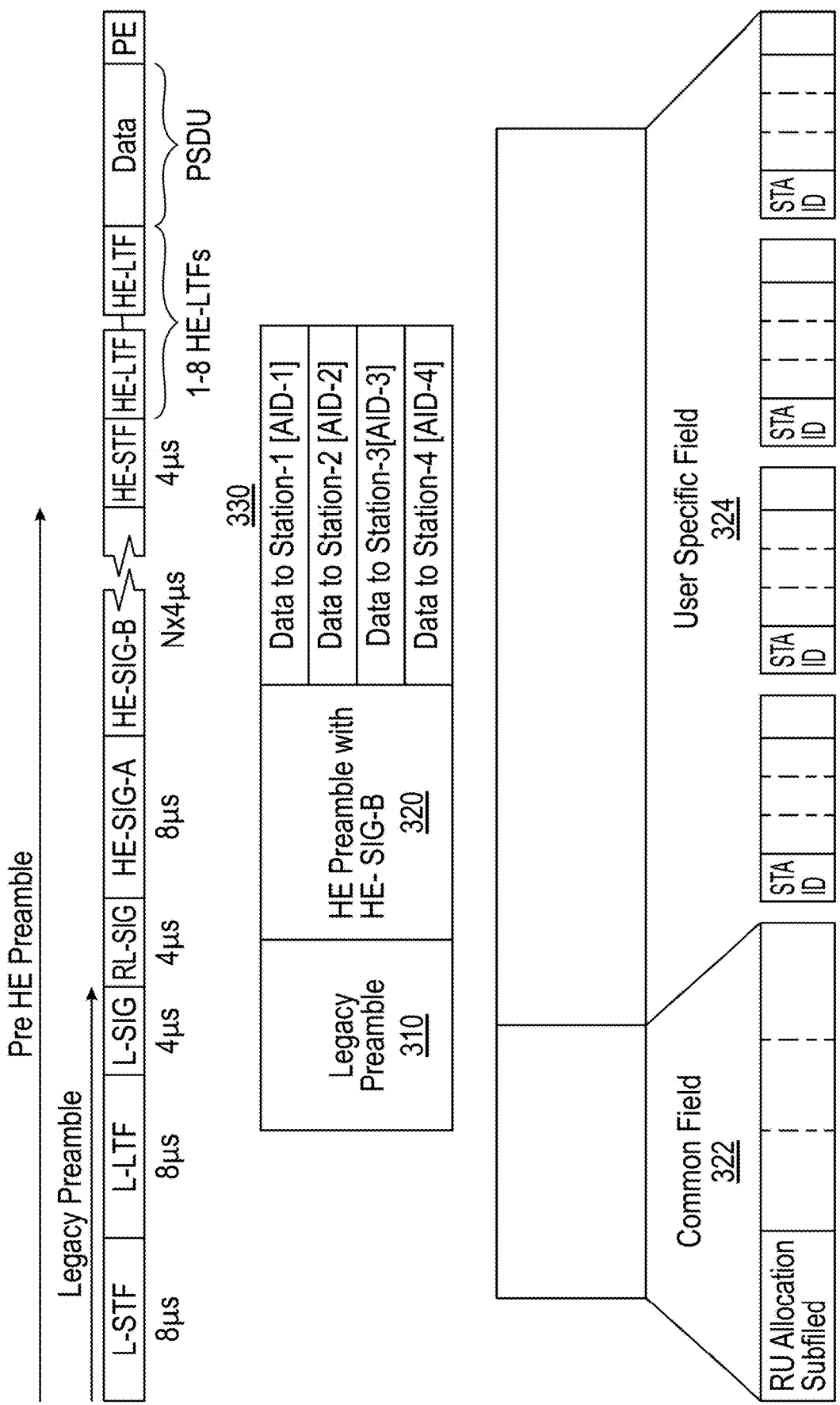
FIG. 3 is a block diagram illustrating an HE MU-PPDU frame format with an HE-SIG-B Field, according to an embodiment.

I. Network Systems for Dynamic Subcarrier Allocation of OFDMA Data (FIGS. 1-3)

Figure 1:
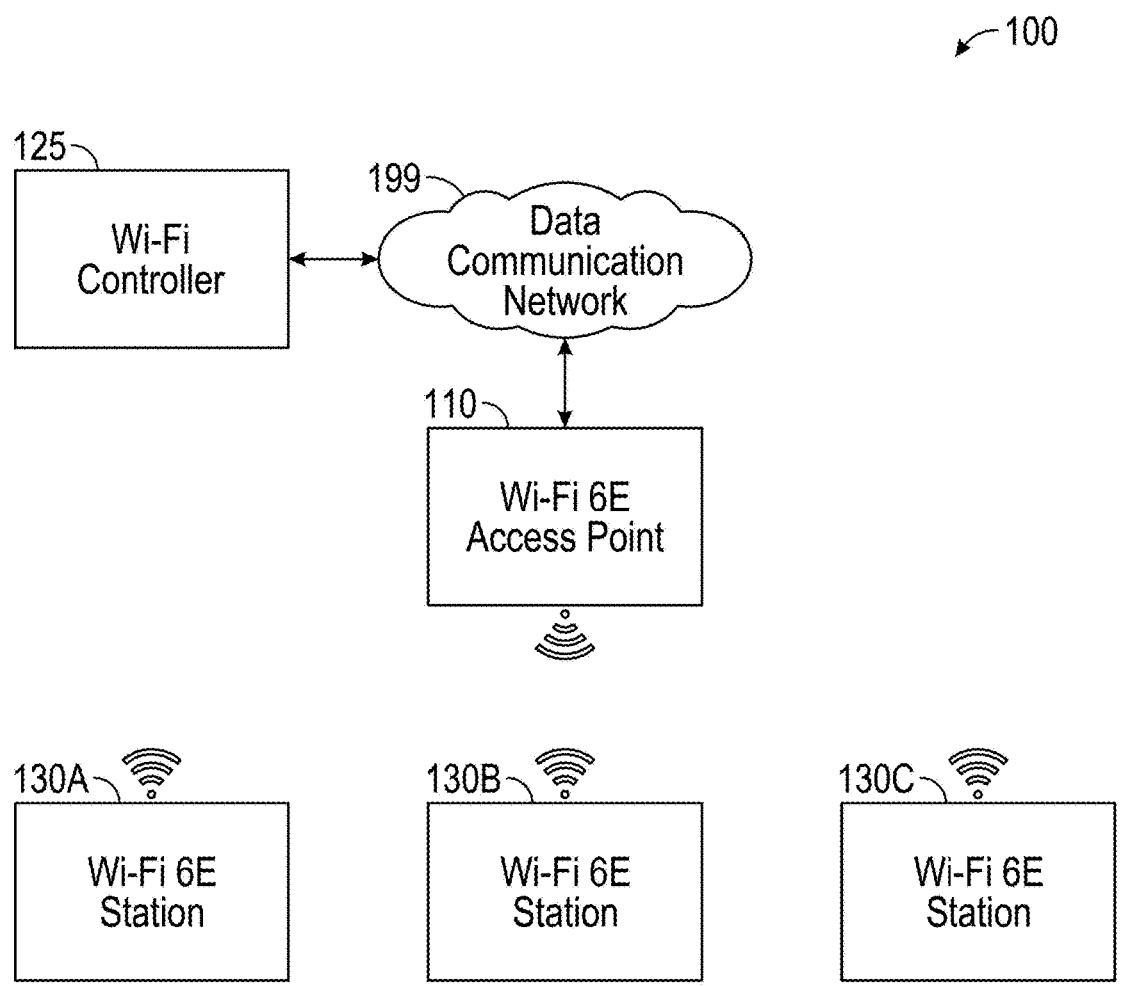
FIG. 1 is a high-level block diagram illustrating a network system for dynamic subcarrier allocation of OFDMA data between Wi-Fi 6E stations based on known malicious activity, according to one embodiment.

FIG. 1 is a high-level block diagram illustrating a network system 100 for dynamic subcarrier allocation of OFDMA data between Wi-Fi 6E stations based on known malicious activity, according to one embodiment. The network system 100 includes a Wi-Fi 6E access point 110 among a group of access points 120A-C serving Wi-Fi 6E stations 130A-C. Other embodiments of the system 100 can include additional components that are not shown in FIG. 1, such as controllers, network gateways, routers, switches, additional access points (Wi-Fi 6E access points and others), and additional wired or wireless stations (Wi-Fi 6E stations and others). Many variations are possible. The components are implemented in hardware, software, or a combination of both, as shown in the example below of FIG. 6.

The Wi-Fi 6E access point 110 can be coupled to a data communication network 199 such as a private network connected to the Internet. The Wi-Fi 6E access point 110 can be connected to the data communication system both via hard wire (e.g., Ethernet) and via wireless networking, and serve as a bridge for access back and forth. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

The Wi-Fi 6E access point 110 dynamically allocates subcarrier bandwidth based on known malicious behavior of Wi-Fi 6E stations. In one example, deep packet inspection is performed to detect malicious activity, leading to an increased current activity score which can, in turn, lower precedence ranking amount other Wi-Fi 6E stations during simultaneous transmissions. In other words, malicious activity is punished with reduced subcarrier access. In one embodiment, non-OFDMA data bypasses resource allocation. On the other hand, OFDMA data, destined for more than two users, is differentiated. Specifically, malicious actors, as reflected in a current activity score are allocated fewer RUs.

The current activity score can be calculated initially, and then periodically updated. A new station can be presumed innocent with a clean current activity score, or presumed suspicious with an imperfect current activity score that improves over time with trustworthy network behavior. There are many variations of how to calculate current activity score. Weightings of different factors can be tuned for a specific system. Examples of factors can include an application violation, a service violation, unauthorized URL access, banned file attachment violation, content policy violation, and a denial of service. Each of the factors can be individually weighted to have more or less significance on the final score. Once calculated, the current activity score directly or indirectly ranks stations between each other for priority in subcarrier allocations.

As a result, in an example Case 1:

AP in 20 MHz, with available 256 subcarriers, with 4 users (stations) connected, and assume all 4 stations assigned same precedence index being have the same activity score (AS/precedence index is derived for each user), therefore AP may allocate equal subcarriers to each station such as 52, 52, 52, 52.

In the same example Case 2:

Assume all 4 users gets different AS and so precedence index of User1<User2<User3<User4. Therefore, AP has to allocate subcarriers such that User4 will get equal or more subcarriers than User3. User3 will get equal or more subcarriers than User2. User2 will get equal or more subcarriers than User1. Hence AP may allocate available subcarriers to stations such as 26, 52, 52, 106 and thus highest AS gets the lowest subcarrier in the OFDMA burst.

In ordinary operations, the Wi-Fi 6E access point 110 broadcasts beacons periodically to advertise connection services. A station within range of the RF signal becomes aware of access points to choose from for connections services.

The Wi-Fi 6E station 130 is capable of Wi-Fi 6E operations when connecting to the wireless network. The device can be a laptop, a smart telephone, a PC, a smart appliance, or any appropriate processor-driven device. For example, in an office environment, workers use office computing equipment and bring personal devices from home, and connect these devices for Internet service. Data traffic to and from the Wi-Fi 6E stations characterizes malicious behavior. A user can run a network application such as a browser which generates data traffic.

A Wi-Fi controller 125, in some embodiments, also participates in dynamic OFDMA subcarrier allocation. In general operations, the Wi-Fi controller 125 manages the access points 110 along with other access points on the data communication network 199. In doing so, network statistics collected can be leveraged for determining when and how to send OFDMA data. For example, malicious activity of a station can be tracked over a span of connections to different access points by the Wi-Fi controller 125 rather than a single session. This enhanced history provides longer history and also provides history for new connections. Various aspects of historical data, current activity score calculations, and precedence table maintenance can be shared between the Wi-Fi 6E access point 110, other access points, and the Wi-Fi controller 125.

FIG. 2 is a more detailed block diagram illustrating the Wi-Fi 6E access point 110 of FIG. 1, according to an embodiment. The Wi-Fi access point 110 includes a channel monitoring module 210, a current activity score module 220, a precedence table module 230, and a transmission module 240. Components can be implemented in software and/or software. Many other variations of components are possible.

The channel monitoring module 210 monitors data traffic for each of the Wi-Fi 6E stations for malicious activity. Each Wi-Fi 6E station is wirelessly coupled over a Wi-Fi network to the Wi-Fi 6E access point to reach the data communication network. The network traffic can be examined by DPI to check for signatures of any malicious activity. This process can be part of a general network security system that outputs pre-identified security violations to the present system at the channel monitoring module 210 for action. Network traffic is examined for metadata info such as packet header, process parameters (rate, pool, etc.), input/output ports, priority (802.1p and TOS), VLAN (802.1Q), source/destination prefix, next hop address, source and destination address, URL associated with source/destination. Permitted applications, services and protocol and specific rules can be programmed by user or administrator.

The current activity score module 220 periodically calculates a current activity score for each Wi-Fi 6E station from the data traffic based on malicious activity identified for each Wi-Fi 6E station. Updates can be based on time or triggering events. In one case, a station requests an updated score and, in another case, an access point request an updated score for a particular station.

Initially, ASbase (at the beginning of connection)=0. As behavior is monitored over time, AScur=(a*w app+s*w services+u*w url+f*w file+c*w cp+d*w dos).

The ASbase term denotes the base activity score and AScur denotes the current score. The w app, w services, w url, w file, w cp, w dos denotes the weighted score assigned to application violation, service violation, unauthorized URL access, banned file attachment violation, content policies violation and denial of service detection. The A, s, u, f, c and d denotes the total no of application violation detections, service violation detections, total no of unauthorized URL access detections, total no of incidents of banned file attachment detections, no of content policy violations and total no of detected dos.

The precedence table module 230 can maintain an assigned a precedence index for each Wi-Fi 6E station as a relative ranking between the Wi-Fi 6E stations, based on the current activity score. The data can be stored in tabular form or as a searchable database.

The OFDMA transmission module 240, responsive to having non-OFDMA data to send downlink, skips look-ups in the precedence table and transmitting the non-OFDMA data downlink over the Wi-Fi network. Responsive to having OFDMA data to send downlink and more than two Wi-Fi 6E stations are addressed, the OFDMA transmission module 240 looks-up in the precedence table to find out the precedence index for the stations involved in the OFDMA data to send to the more than two stations. Then, subcarriers from a channel are dynamically allocated by between the more than two stations. More bandwidth quantity is allocated to a higher precedence index.

The OFDMA transmission module 240 generates a HE MU-PPDU data frame in a HE-SIG-B field destined for each of the more than two stations. A resource unit (RU) allocation bitmap representing subcarrier allocation. The OFDMA data is transmitted downlink over the Wi-Fi network to the more than two stations, within the HE MU-PPDU data frame, according to bandwidth allocation of the RU allocation.

An example HE MU-PPDU data frame 300 is shown in FIG. 3. The HE MU-PPDU frame 300 includes a legacy preamble field 310, an HE preamble with HE-SIG-B field 320, and a list of association identifiers 330. The HE-SIG-B field 320 further includes a common field 322 and a user specific field 324. The common field 322 contains information on how the channel is subdivided for the data part of it. It is a bit pattern and tells how the channel is subdivided in carriers. The user specific field 324 includes station identifiers, a number of spatial streams, a user of transmit beamforming, an MCS, a dual carrier modulation (DCM) or not, and a coding scheme (BCC or LDPC).

The OFDMA transmission module 240 then transmits data packets, for example, using bandwidth allocations and RU allocations for multiple wireless clients over the remaining channel transmission bandwidth. One hardware embodiment includes Wi-Fi transceivers that signal across a wireless channel. Hardware adjustments are made to turn in specific bandwidth and spectrum.

II. Methods for Dynamic Subcarrier Allocation of OFDMA Data (FIGS. 4-5)

Figure 4:
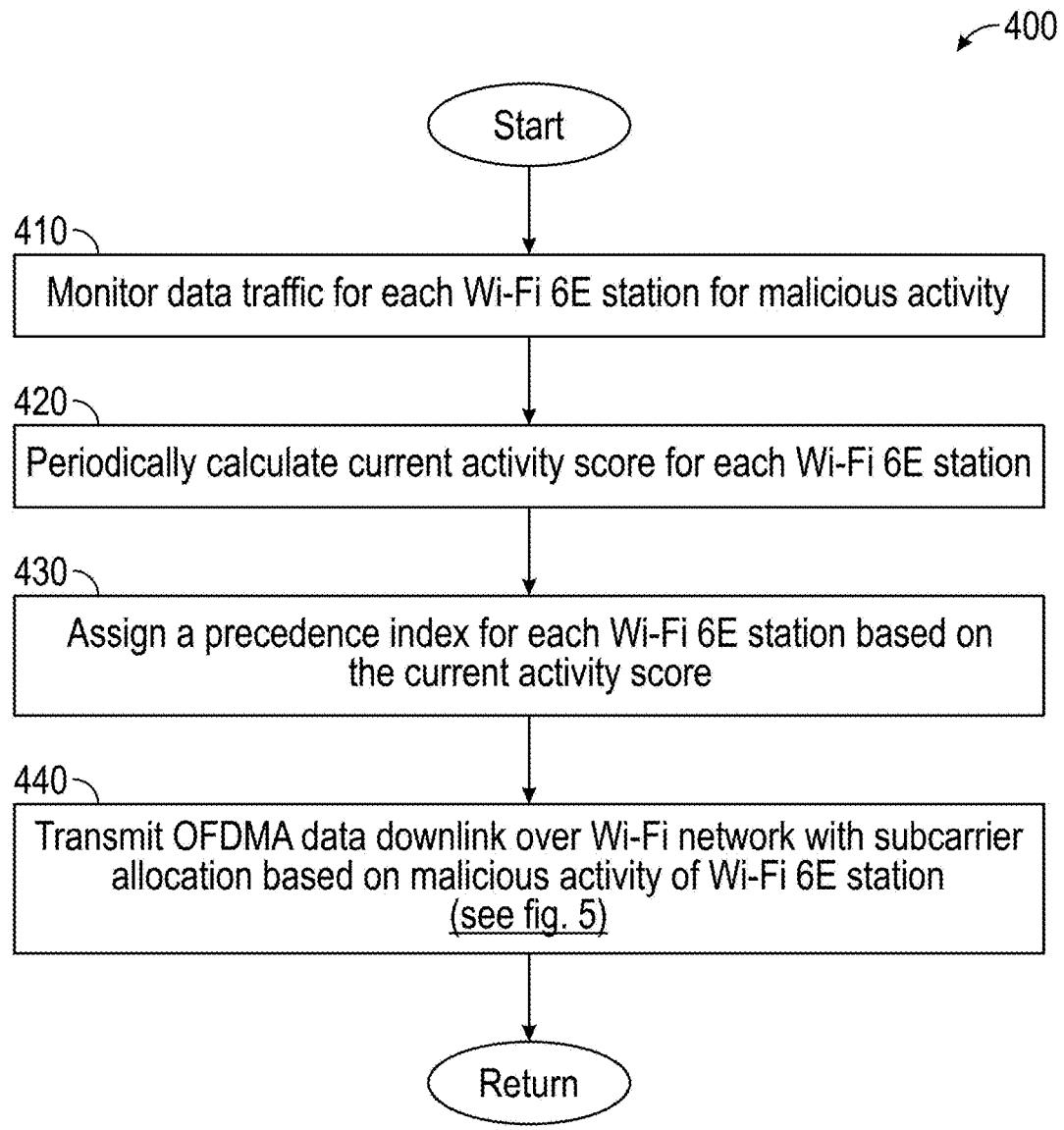
FIG. 4 is a high-level flow chart for transmitting OFDMA data for network security, according to an embodiment.
Figure 5:
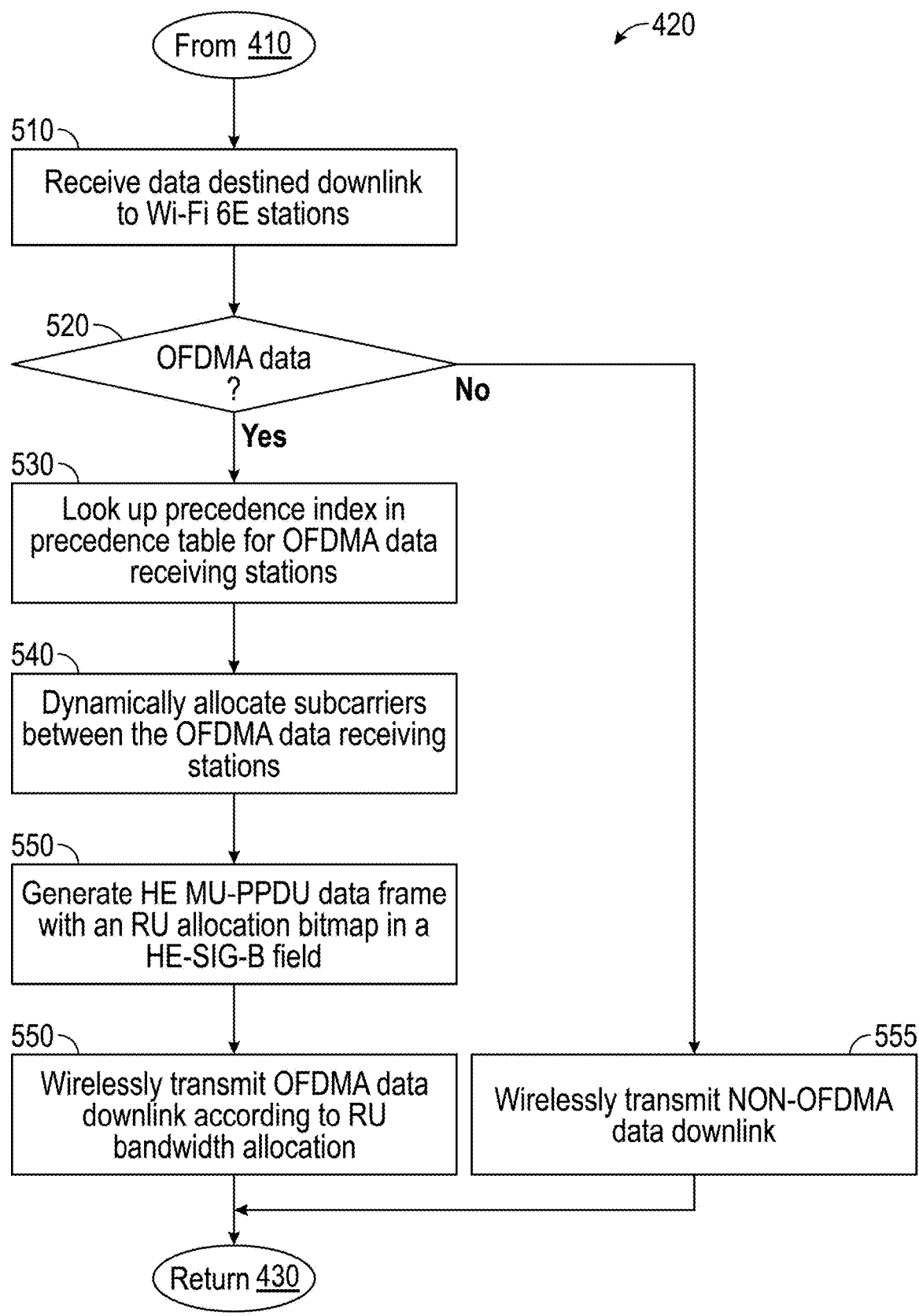
FIG. 5 is a more detailed flow chart for a step of dynamic subcarrier allocation of OFDMA data between Wi-Fi 6E stations based on known malicious activity, from the method of FIG. 4, according to one embodiment.

FIG. 4 is a high-level flow diagram illustrating a method 400 for dynamically adjusting channel bandwidth and spectral usage according to data traffic levels. The method 400 can be implemented by, for example, system 100 of FIG. 1.

At step 410, data traffic is monitored for each of the Wi-Fi 6E stations for malicious activity. Each Wi-Fi 6E station is wirelessly coupled over a Wi-Fi network to the Wi-Fi 6E access point to reach the data communication network.

At step 420, a current activity score is periodically calculated for each Wi-Fi 6E station from the data traffic based on malicious activity identified for each Wi-Fi 6E station.

At step 430, a precedence index is assigned for each Wi-Fi 6E station as a relative ranking between the Wi-Fi 6E stations, based on the current activity score.

At step 440, data is transmitted downlink over the Wi-Fi network.

A more detailed example of step 420 for adjusting transmission bandwidth usage using dynamic puncturing, is shown in FIG. 5, according to one embodiment. At step 510 it is determined whether data is OFDMA data or non-OFDMA data. At step 520, responsive to having non-OFDMA data to send downlink, look-ups are skipped in the precedence table and non-OFDMA data is transmitted downlink over the Wi-Fi network, at step 555.

At step 530, responsive to having OFDMA data to send downlink and more than two Wi-Fi 6E stations are addressed, the precedence table is accessed to look-up the precedence index for the stations involved in the OFDMA data to send to the more than two stations. At step 540, a bandwidth quantity of subcarriers is dynamically allocated in a channel between the more than two stations. More bandwidth quantity is allocated to a higher precedence index.

At step 550, a HE MU-PPDU data frame is generated in a HE-SIG-B field destined for each of the more than two stations, including a resource unit (RU) allocation bitmap representing subcarrier allocation. At step 560, the OFDMA data is transmitted downlink over the Wi-Fi network to the more than two stations, within the HE MU-PPDU data frame, according to bandwidth allocation of the RU allocation.

III. Computing Device for Dynamic Subcarrier Allocation of OFDMA Data (FIG. 6)

Figure 6:
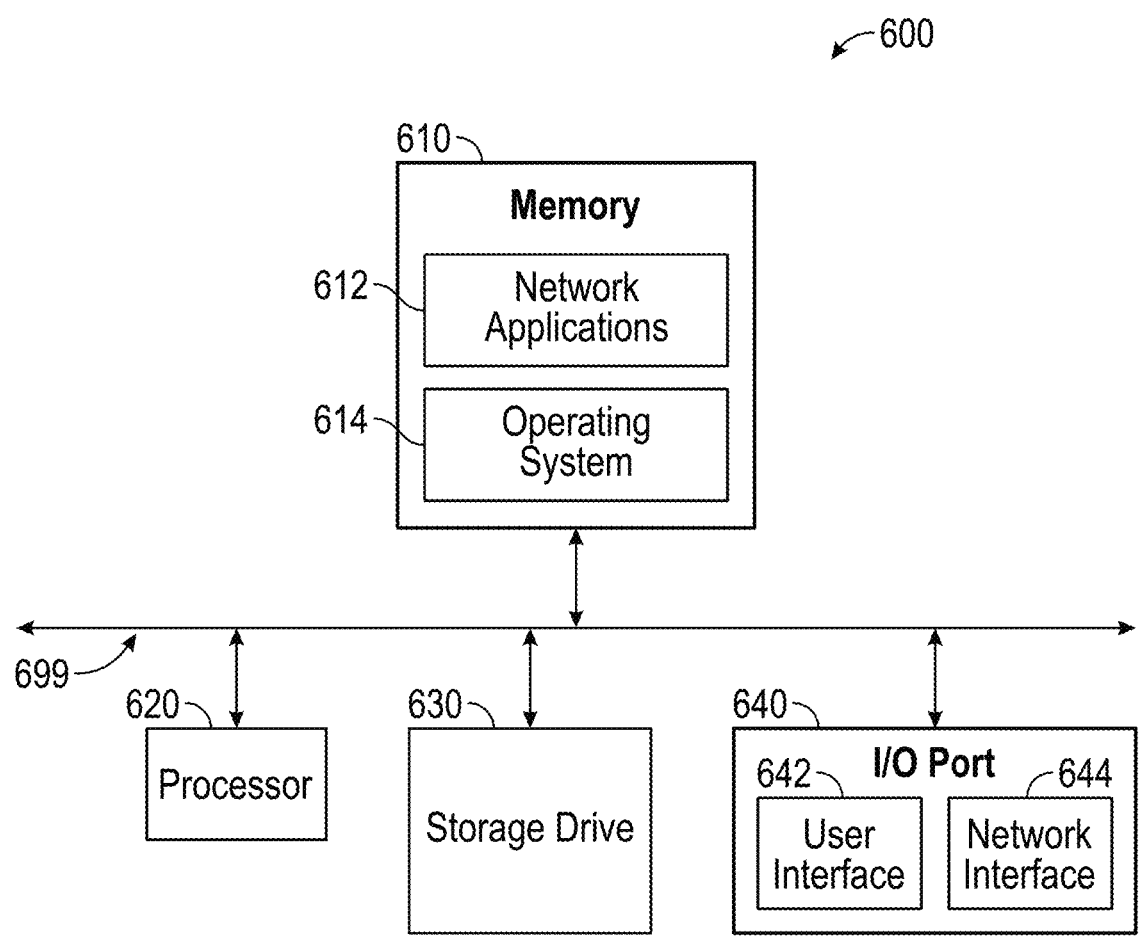
FIG. 6 is a block diagram illustrating an example computing device implementing the packet processor of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the Wi-Fi 6E access point 110, access points 120A-C and Wi-Fi 6E station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method, in a Wi-Fi 6E access point on a data communication network, for dynamic subcarrier allocation of Orthogonal Frequency Division Multiple Access (OFDMA) data between Wi-Fi 6E stations based on known malicious activity, the method comprising the steps:

monitoring data traffic for each of the Wi-Fi 6E stations for malicious activity, wherein each Wi-Fi 6E station is wirelessly coupled over a Wi-Fi network to the Wi-Fi 6E access point to reach the data communication network;

periodically calculating a current activity score for each Wi-Fi 6E station from the data traffic based on malicious activity identified for each Wi-Fi 6E station;

assigning a precedence index for each Wi-Fi 6E station as a relative ranking between the Wi-Fi 6E stations, based on the current activity score;

responsive to having non-OFDMA data to send downlink, skipping look-ups in the precedence table and transmitting the non-OFDMA data downlink over the Wi-Fi network; and responsive to having OFDMA data to send downlink and more than two Wi-Fi 6E stations are addressed:

looking-up in the precedence table to find out the precedence index for the stations involved in the OFDMA data to send to the more than two stations;

dynamically allocating a bandwidth quantity of subcarriers in a channel between the more than two stations, wherein more bandwidth quantity is allocated to a higher precedence index;

generating a HE MU-PPDU data frame in a HE-SIG-B field destined for each of the more than two stations, including a resource unit (RU) allocation bitmap representing subcarrier allocation; and transmitting the OFDMA data downlink over the Wi-Fi network to the more than two stations, within the HE MU-PPDU data frame, according to bandwidth allocation of the RU allocation bitmap.

2. The method of claim 1, further comprising:
receiving data from one of the more than two stations based on the RUs from the bandwidth allocation.

3. The method of claim 1, wherein the bandwidth allocation is equal responsive to the two or more stations have an equal precedence index.

4. The method of claim 1, wherein a primary channel transmission bandwidth comprises 20 MHz with 256 subcarriers.

5. The method of claim 1, wherein the RU allocation bitmap identifies each station by an association ID.

6. The method of claim 1, wherein the two or more stations, upon receiving the transmission, check the RU allocation bitmap for an association ID, and if matching, checks the RU allocation to tune listening for the transmission.

7. The method of claim 1, wherein responsive to having a current activity score above a threshold precludes data packets from being sent while management packets continue to be sent.

8. The method of claim 1, wherein the current activity score is derived from one or more of: an application violation, a service violation, unauthorized URL access, banned file attachment violation, content policy violation, and a denial of service violation.

9. A non-transitory computer-readable medium storing computer-readable instructions in a Wi-Fi 6E access point on a data communication network, that when executed by a processor, perform a method for dynamic subcarrier allocation of Orthogonal Frequency Division Multiple Access (OFDMA) data between Wi-Fi 6E stations based on known malicious activity, the method comprising:
monitoring data traffic for each of the Wi-Fi 6E stations for malicious activity, wherein each Wi-Fi 6E station is wirelessly coupled over a Wi-Fi network to the Wi-Fi 6E access point to reach the data communication network;
periodically calculating a current activity score for each Wi-Fi 6E station from the data traffic based on malicious activity identified for each Wi-Fi 6E station;
assigning a precedence index for each Wi-Fi 6E station as a relative ranking between the Wi-Fi 6E stations, based on the current activity score;
responsive to having non-OFDMA data to send downlink, skipping look-ups in the precedence table and transmitting the non-OFDMA data downlink over the Wi-Fi network; and
responsive to having OFDMA data to send downlink and more than two Wi-Fi 6E stations are addressed:
looks-up in the precedence table to find out the precedence index for the stations involved in the OFDMA data to send to the more than two stations;
dynamically allocating a bandwidth quantity of subcarriers in a channel between the more than two stations, wherein more bandwidth quantity is allocated to a higher precedence index;
generating a HE MU-PPDU data frame in a HE-SIG-B field destined for each of the more than two stations, including a resource unit (RU) allocation bitmap representing subcarrier allocation; and
transmitting the OFDMA data downlink over the Wi-Fi network to the more than two stations, within the HE MU-PPDU data frame, according to bandwidth allocation of the RU allocation.

10. A Wi-Fi 6E access point on a data communication network, for dynamic subcarrier allocation of Orthogonal Frequency Division Multiple Access (OFDMA) data between Wi-Fi 6E stations based on known malicious activity, the Wi-Fi 6E access point comprising:
a processor;
a network communication module, communicatively coupled to the processor and to the data communication network; and
a memory, communicatively coupled to the processor and storing:
a monitoring module to monitor data traffic for each of the Wi-Fi 6E stations for malicious activity, wherein each Wi-Fi 6E station is wirelessly coupled over a Wi-Fi network to the Wi-Fi 6E access point to reach the data communication network;
an activity score module to periodically calculate a current activity score for each Wi-Fi 6E station from the data traffic based on malicious activity identified for each Wi-Fi 6E station;
a precedence table module to calculate and store a precedence index for each Wi-Fi 6E station as a relative ranking between the Wi-Fi 6E stations, based on the current activity score;
a transmission module to, responsive to having non-OFDMA data to send downlink, skip look-ups in the precedence table and transmitting the non-OFDMA data downlink over the Wi-Fi network,
wherein the transmission module, responsive to having OFDMA data to send downlink and more than two Wi-Fi 6E stations are addressed:
looks-up in the precedence table to find out the precedence index for the stations involved in the OFDMA data to send to the more than two stations;
dynamically allocates a bandwidth quantity of subcarriers in a channel between the more than two stations, wherein more bandwidth quantity is allocated to a higher precedence index;
generates a HE MU-PPDU data frame in a HE-SIG-B field destined for each of the more than two stations, including a resource unit (RU) allocation bitmap representing subcarrier allocation; and
transmits the OFDMA data downlink over the Wi-Fi network to the more than two stations, within the HE MU-PPDU data frame, according to bandwidth allocation of the RU allocation.

* * * * *